Jan. 4, 1938.　　　O. H. BANKER　　　2,104,014
CLUTCH MECHANISM
Filed July 16, 1934　　　2 Sheets-Sheet 1

INVENTOR
Oscar H. Banker
BY
Quarles & French
ATTORNEYS

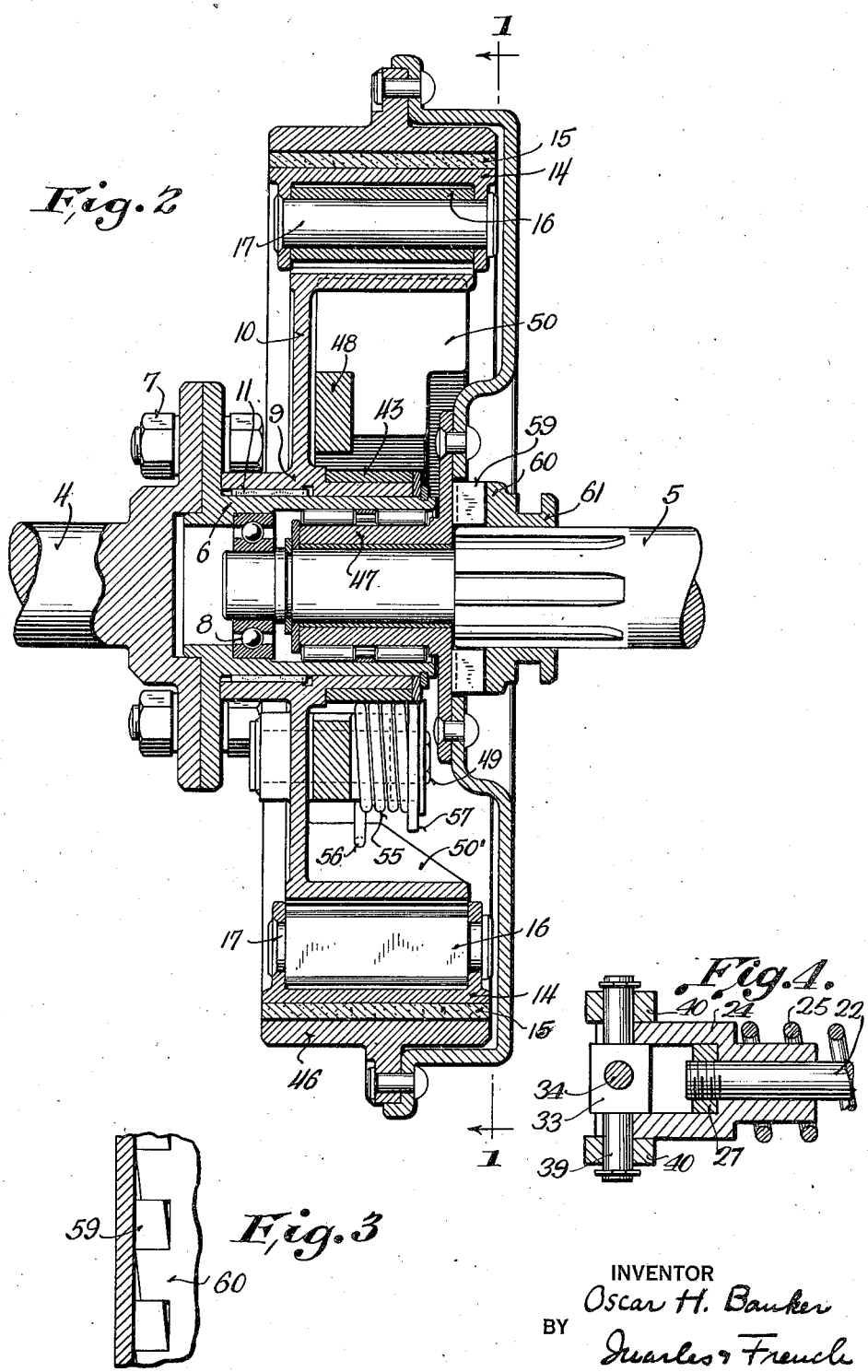

Patented Jan. 4, 1938

2,104,014

UNITED STATES PATENT OFFICE 2,104,014

CLUTCH MECHANISM

Oscar H. Banker, Chicago, Ill., assignor to New Products Corporation, Chicago, Ill., a corporation of Illinois Application July 16, 1934, Serial No. 735,411

8 Claims. (Cl. 192—48)

The invention relates to clutch mechanism.

One of the objects of the invention is to provide an automatic clutch of the internal expanding type with a positive jaw clutch of the overrunning type providing for a manual release, so that the clutch mechanism can be used with a sliding gear transmission.

A further object of the invention is to provide a clutch for connecting the propelling motor of a vehicle with its transmission and in which when the motor is dead, the driven element drives the driving element through a one way automatic hub clutch.

A further object of the invention is to provide certain improvements in clutch mechanism over that shown and described in my United States Letters Patent No. 2,042,454 of June 2, 1936, for Clutch mechanism.

The invention further consists in the several features hereinafter set forth and more particularly defined by claims at the conclusion hereof.

In the drawings:

Fig. 2 is a detail sectional view taken on the line 2—2 of Fig. 1;

Fig. 3 is a detail view of a part of the clutch mechanism.

Fig. 4 is a detail sectional view through parts of the operating linkage taken on the line 4—4 of Fig. 1.

Figure 1:
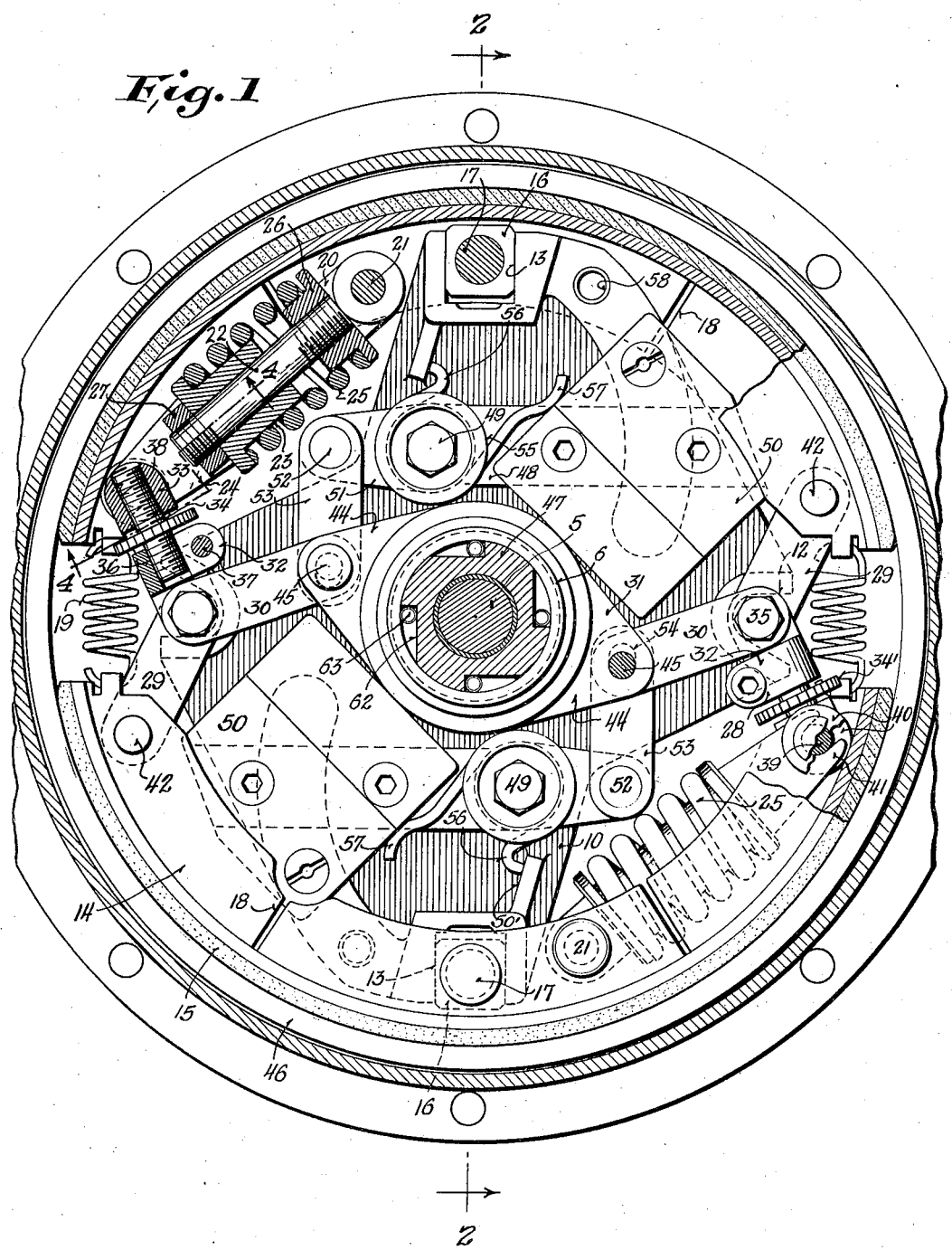
Fig. 1 is a detail sectional view taken on the line 1—1 of Fig. 2, parts being broken away and parts being shown in section.

Referring to the drawings, the numeral 4 designates the engine shaft or drive shaft and 5 a driven shaft connected thereto by clutch mechanism embodying the invention.

The drive shaft 4 is shown as provided with a sleeve hub extension 6 secured to the main shaft by a flanged coupling connection including the bolts 7 and carrying a ball bearing journal bearing 8 in which the end of the driven shaft is mounted.

The hub 9 of a spider or support 10 is keyed at 11 to the hub extension 6, said support having oppositely disposed link guide slots 12 and oppositely disposed anchor pin guide bosses 13 therein.

Clutch elements 14 in the form of semi-cylindrical shoes are provided with a suitable lining 15 and are generally channel shaped in cross section with rectangular guide blocks 16 secured centrally thereof by pins 17 and working in the guide bosses 13, the flanges or sides of the channel intermediate their ends being slotted as indicated at 18 to provide for some resiliency or flexing of the shoes. These shoes are normally held in a release position by sets of release springs 19, each of which has hooked connections at its ends with the shoes.

A thrust mechanism is associated with each shoe so that the shoes may be placed under a yielding pressure and comprises a spring carrier 20 pivotally mounted on a pin 21 carried by the intermediate portion of the shoe and including a pin 22 having the hub 23 of a yoke or forked member 24 slidably mounted thereon. A spring 25 is interposed between the hub 23 and the base 26 of the carrier 20 and is placed under a predetermined tension by the nut 27 in threaded engagement with the pin 22 which has adjustable threaded connection with the base 26.

The shoes are moved into clutched engagement with the drum 46 by a double toggle mechanism acting respectively on the ends of the shoes. Each double toggle includes a toggle formed by a link 28 and a link 29 and a toggle formed by the link 30 and a link 31.

The link 28 is an adjustable link including end parts 32 and 33 and an adjustable screw part 34. The part 32 is secured at one end by a pivot bolt 35 to the links 29 and 30, and it has a split nut portion 36 in which one of the threaded ends of the screw 34 is in threaded engagement and to which it is clamped by a bolt 37. The part 33 has a threaded bore 38 to receive the other threaded end of the screw 34 and it has pin extensions 39, each having a roller 40 mounted thereon and an end engaged by one of the forked ends 41 of the member 24, said rollers adapted to ride on the web of the shoe. The link 29 is a plain link pivotally connected to the adjacent shoe by a pin 42. With this arrangement, the turning of the screw 34 by the head 34' in one direction will act to lengthen the link. Thus when the linings wear down and it becomes necessary to adjust the shoes closer to the drum, this is done by lengthening said links 28.

The link 31 is in the form of an equalizer member having its hub 43 mounted to rotate on the hub 9 of the support 10 and provided with diametrically disposed forked arms 44 pivotally connected by the pins 45 to one of the ends of the links 30.

Swinging the equalizer counterclockwise as viewed in Fig. 1 straightens out the sets of links 31, 30 relative to each other, and these then exert a thrust on the pivots 35 and act to straighten out the sets of links 28, 29 which thus exert a thrusting force upon the ends of the shoes, it being noted that this force is limited to a predetermined amount by the compression of the springs 25 as the rollers 40 move away from the ends of the shoes.

The shoes 14 are moved into contact with a clutch drum 46 having a hub 47 mounted on the driven shaft 5 and adapted to be connected thereto as hereinafter described.

Each toggle mechanism is preferably operated through speed responsive mechanism including a lever 48 pivoted on a pin 49 on the support 10 and having a weighted end 50 and a shorter arm 51 pivotally connected by a pin 52 to a link 53 which is operatively connected at its end to the pin 45 preferably by a lost motion connection therewith through the slot 54 in said link.

The levers 48 are moved to release position in each instance by a coiled torsion spring 55 engaging at one end 56 a lug 50' on the support 10 and at its other end 57 engaging the weight. The weighted lever 48 is preferably prevented from hunting by spring pressed detent mechanism, similiar to that of my prior application Serial No. 599,896 filed Mar. 19, 1932, now Patent No. 2,042,454 and in which the detent is mounted in the weight and adapted to engage one or more openings 58 in the support 10, the opening shown in Fig. 1 being used to hold the weighted lever in expanded condition.

With this arrangement when the speed of the drive shaft 4 reaches a certain predetermined value, the weighted ends of the levers 48 under the action of centrifugal force swing outwardly against the action of the springs 55 to an expanded position and in this movement operate the toggle links, previously mentioned, through the links 53 to apply the clutch shoes 14 to the drum 46. On reaching their expanded positions the weighted members are restrained from hunting by the engagement of the detents in the recesses 58. It is to be noted that the arrangement of the links 30 and 31 is such that these links have substantially a straight line position when they are in applied or clutching position. Consequently, under these conditions the back pressure exerted by the springs 25 on the toggle links 28 has practically no reaction on the weighted levers through the links 30 and 31. Therefore, the lost motion connections afforded by the slots 54 permit the weights to fluctuate some without having maximum locked position in order to hold the clutch in clutched position. Where the levers 48 are held in expanded position by the detents, the lost motion connections are of advantage, as it permits of the initial release of the detents before said levers move to a position in which the links 53 can break the toggle joint between the links 30 and 31. Thus this lost motion connection permits the full action of the release spring on its weight to release it from its locking detent, when the speed drops below a certain predetermined value, which is less than that at which engagement took place, and then imparts enough momentum to break the toggle joints of the clutch applying mechanism from their straight line position and then allows the springs 19 to release the shoes 14 from clutched engagement with the drum 46.

It is to be noted that the yielding thrust connection provided by spring 25 and its mounting permits of an automatic take-up for wear in the friction lining. The preloading spring pressure of the springs 25 is such as to give the full load torque capacity for which the the clutch is particularly designed even though the travel of the yoke 24 may become less by the constant use of the clutch.

In this construction the driving of the driven member through the shoes is effected through the bosses 13 and not through the toggles that operate the shoes so that there is no self-energizing effect with its possible erratic grabbing and chattering action, and as a result also since the toggles do not carry the driving load, they may be made of simple and light construction.

For immediately releasing the driving and driven members from clutched engagement I have provided a manually operable clutch including a jaw clutch member 59 formed integral with or secured to hub 47 of the clutch drum 46 and adapted to engage a mating jaw clutch member 60 formed integral with or secured to a manually shiftable collar 61 slidably splined to the driven shaft. The clutch members 59 and 60 are of the positive jaw clutch overrunning type and are so arranged that, when this clutch is used with a manually operated change speed gear mechanism and the operator disengages said clutch members to permit him to change gears, then the clutch member 59 will be running slower than the clutch member 60 so that these parts will overrun until in making an engagement the operator steps on the gas and speeds up the motor so as to bring the speed of the clutch member 59 up to that of the member 60.

To permit the driven shaft 5 to act as a driving member when, for example, the motor driving the shaft 4 is dead, an overrunning clutch is provided between these two shafts and includes an actuator formed by the hub 47 and including the roller receiving grooves 62, a clutch drum formed by the sleeve extension 6 and the clutch rollers 63 mounted in the grooves 62 and adapted when the shaft 5 and hub 47 turn anticlockwise as viewed from the left side of Fig. 2 to engage said clutch drum and thus rotate the drive shaft 4 therewith.

I desire it to be understood that this invention is not to be limited to any particular form or arrangement of parts except in so far as such limitations are included in the claims.

What I claim as my invention is:

1. In a clutch mechanism, the combination of a rotatable drive member, a rotatable driven member, an internal expanding clutch including clutch elements connecting said members together in driving relation, centrifugally operable means for controlling said clutch elements, an automatic overrunning clutch connection between said members permitting the drive of said drive member by said driven member, and a manually releasable jaw clutch of the overrunning type for releasing said driven member from driven relation with said drive member.

2. In a clutch mechanism, the combination of a rotatable drive member, a rotatable driven member, a clutch drum, a manually controlled positive jaw clutch mechanism of the overrunning type for connecting said drum with said driven member, internal expanding clutch elements connecting said drive member with said drum, centrifugally operable means for controlling said clutch elements, said drum having a hub and said drive member having a hub, and an automatic overrunning clutch connection between said hubs.

3. In a clutch, the combination of a rotatable drive member, a rotatable driven member, clutch shoes mounted on said drive member and movable into clutching relation with said driven member, means for operating said clutch shoes including sets of toggle links interposed between the ends of said shoes, a yielding connection between one of said links and the adjacent shoe comprising a carrier pivotally connected to the intermediate portion of said shoe, a spring mounted on said carrier, and means connecting the spring with said link and having a thrust connection with the end portion of said shoe.

4. In a clutch, the combination of a rotatable drive member, a rotatable driven member, clutch shoes mounted on said drive member and movable into clutching relation with said driven member, means for operating said clutch shoes including sets of toggle links interposed between the ends of said shoes, a yielding connection between one of said links and the adjacent shoe comprising a carrier pivotally connected to the intermediate portion of said shoe, a spring mounted on said carrier, and means connecting the spring with said link and having a roller riding the end portion of said shoe.

5. In a clutch, the combination of a rotatable drive member, a rotatable driven member, clutch shoes mounted on said drive member and movable into clutching relation with said driven member, means for operating said clutch shoes including sets of toggle links interposed between the ends of said shoes, one of said links having a roller engaging the end of the adjacent shoe, and a tensioned spring connection between an intermediate portion of said shoe and said roller.

6. In a clutch, the combination of a rotatable drive member, a rotatable driven member, a clutch shoe mounted on said drive member and movable into clutching relation with said driven member, means for operating said clutch shoe including a link having roller thrust connection with its shoe and a yielding anchorage connection between said shoe and said link.

7. In a clutch, the combination of a rotatable drive member, a rotatable driven member, a clutch shoe mounted on said drive member and movable into clutching relation with said driven member, means for operating said clutch shoe including a link having roller thrust connection with its shoe and a yieldable link connecting said first named link to said shoe to compensate for wear of the clutching surface of said shoe.

8. In a clutch mechanism, the combination of a rotatable drive member, a rotatable drum, centrifugally operable friction elements connecting said drive member and drum together at a predetermined speed, a driven shaft, and a jaw clutch of the overrunning type under the control of the operator to directly disconnect said drum from the driven shaft on a temporary release of the driving torque, regardless of the speed of said drum and driven shaft.

OSCAR H. BANKER.